E. & A. Buckman,
Mouse Trap.
No. 108,104. Patented Oct. 11. 1870.
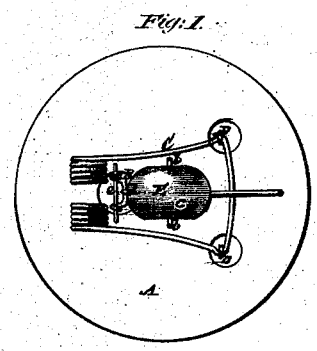
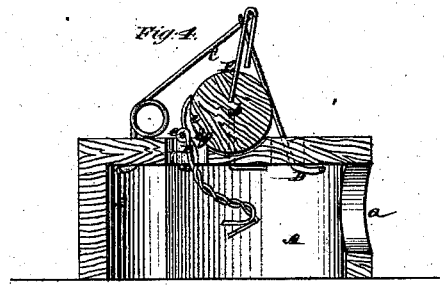
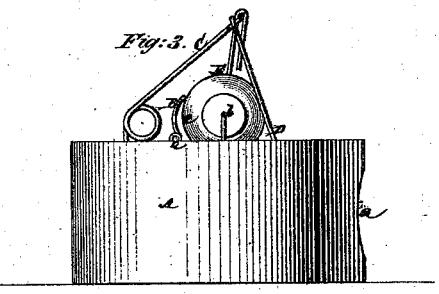

United States Patent Office.

EDWARD BUCKMAN AND ALEXANDER BUCKMAN, OF BROOKLYN, NEW YORK.

Letters Patent No. 108,104, dated October 11, 1870; antedated September 30, 1870.

IMPROVEMENT IN MOUSE-TRAPS.

The Schedule referred to in these Letters Patent and making part of the same.

*To all whom it may concern:*

Be it known that we, EDWARD BUCKMAN and ALEXANDER BUCKMAN, both of Brooklyn, in the county of Kings and State of New York, have invented a new and useful Improvement in Mouse-Traps, of which the following is a full, clear, and exact description, reference being had to the accompanying drawing forming part of this specification, and in which—

Figure 1 represents a plan of our improved mouse-trap, when set;

Figure 2, a side view of the same, under a similar condition;

Figure 3, a side view of said trap, when released from its set; and

Figure 4, a sectional elevation thereof under a like condition.

Similar letters of reference indicate corresponding parts.

Although applicable to different kinds of mouse-traps, our invention is particularly well adapted, and will here be described as applied to traps of a well-known construction, and which consist of a hollow wooden block, provided with one or more interior chambers and lateral entry-holes, and with a swinging bait-hook to each chamber, operating in concert with a setting-wire or device and spring or elastic wire saddle that, when released, lifts a wire-catching strap.

Our invention mainly consists in the application, in place of the usual setting-wire, that is difficult to adjust, of a lever-like device, having its forward end so curved or shaped, and the upper end of the bait-hook so formed, and said hook so hung that, by simply pressing down or operating such lever on its fulcrum, it is made to catch over the bait-hook, and so set the trap.

Referring to the accompanying drawing—

A represents the block or body of a single-chambered trap, and

*a*, the entry-hole thereto.

B, the bait-hook;

C, the spring-wire saddle; and

D, the usual catching-strap or loop.

E is the setting-lever, working on a fulcrum, as at *b*, and having at its forward end a curved surface, *c*, and tooth, *d*, made sloping on its top.

This lever, E, is in slotted or strap-like connection at its back, with the free end of the spring or elastic saddle C, and the bait-hook B, which is pivoted as at *e*, is so hung, and its upper end so formed, that, on operating the lever E, and with it the saddle C and strap D, from the position it is shown to occupy in figs. 3 and 4 to the position shown for it in figs. 1 and 2, it is made to act upon the bait-hook, so that the upper end of the latter falls under the tooth *d*, and thereby sets the trap, the spring saddle C causing the tooth *d* to hold the bait-hook against being accidentally shifted, but admitting of the trap being released from its set by forward pull on the bait, which forces the upper end of the hook from under the tooth, when the spring saddle C is at liberty to fly up, and with it the strap D.

This forms a very simple and expeditious mode of setting the trap, the lever E operating as an automatic setting device, and it involves no costly changes in the manufacture of the trap.

The bait-hook B may be of single wire, shaped as usual to hold the bait, but is here shown as made of wire, doubled and crossed at its lower end, to form double prongs, on which bait of different kinds or of larger size may be more securely held than by a hook of single construction.

What is here claimed, and desired to be secured by Letters Patent, is—

1. The combination of the automatic setting-lever E and spring or elastic saddle C with the strap or loop D, constructed and arranged to operate as herein described, for the purpose specified.

2. In combination with the above, the stop *d* and bait-hook B, as and for the purpose specified.

EDWARD BUCKMAN. [L. S.]
    ALEX. BUCKMAN. [L. S.]

Witnesses:
  S. L. ROWLAND,
  FRED. HAYNES.